(12) United States Patent
Wang et al.

(10) Patent No.: US 11,249,276 B2
(45) Date of Patent: Feb. 15, 2022

(54) LENS STRUCTURE, LENS STRUCTURE FABRICATION METHOD, AND CAMERA

(71) Applicant: Huawei Technologies Co., Ltd., Shenzhen (CN)

(72) Inventors: Jianwen Wang, Shenzhen (CN); Hsienchang Hou, Shenzhen (CN); Hung-Yuan Jau, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 16/475,488

(22) PCT Filed: Apr. 25, 2017

(86) PCT No.: PCT/CN2017/081820
§ 371 (c)(1),
(2) Date: Jul. 2, 2019

(87) PCT Pub. No.: WO2018/126565
PCT Pub. Date: Jul. 12, 2018

(65) Prior Publication Data
US 2020/0174217 A1    Jun. 4, 2020

(30) Foreign Application Priority Data
Jan. 3, 2017    (CN) .......................... 201710002830.1

(51) Int. Cl.
*G02B 9/00* (2006.01)
*G02B 7/02* (2021.01)
*G03B 17/12* (2021.01)

(52) U.S. Cl.
CPC .............. *G02B 7/025* (2013.01); *G02B 7/021* (2013.01); *G03B 17/12* (2013.01)

(58) Field of Classification Search
CPC .......... G02B 7/025; G02B 7/021; G02B 7/02; G03B 17/12; G03B 17/02; H04N 5/2254
(Continued)

(56) References Cited

U.S. PATENT DOCUMENTS

| 2005/0264895 A1 | 12/2005 | Chao |
| 2014/0078606 A1 | 3/2014 | Wu |

(Continued)

FOREIGN PATENT DOCUMENTS

| CN | 102998764 A | 3/2013 |
| CN | 103246039 A | 8/2013 |

(Continued)

OTHER PUBLICATIONS

Machine Translation and Abstract of Japanese Publication No. JP2015018178, Jan. 29, 2015, 19 pages.
(Continued)

*Primary Examiner* — James C. Jones
(74) *Attorney, Agent, or Firm* — Conley Rose, P.C.

(57) ABSTRACT

A lens structure includes a lens tube; a first lens located on a first end-face of the lens tube, where the first lens includes a light converging region and an edge region located at an edge around the light converging region; a light shielding structure covering the edge region of the first lens; and at least one second lens located inside the lens tube. Based on the lens structure, the first lens is disposed on an outer side of a housing of the lens tube. Therefore, an adjustment degree is relatively high, and convenience and flexibility are relatively desirable. In addition, an optical axis of the first lens and an optical axis of the at least one second lens are aligned at a relatively high extent, thereby improving quality of the lens structure and a yield of the lens structure.

20 Claims, 5 Drawing Sheets

(58) Field of Classification Search
USPC .......................................................... 359/738
See application file for complete search history.

(56) References Cited

U.S. PATENT DOCUMENTS

| | | | |
|---|---|---|---|
| 2014/0204476 A1* | 7/2014 | Takase | G02B 7/02 |
| | | | 359/738 |
| 2015/0002726 A1 | 1/2015 | Schmieder et al. | |
| 2016/0178874 A1 | 6/2016 | Kim | |
| 2016/0370579 A1 | 12/2016 | Cho et al. | |
| 2017/0223245 A1 | 8/2017 | Park | |
| 2019/0064399 A1 | 2/2019 | Wang et al. | |

FOREIGN PATENT DOCUMENTS

| | | |
|---|---|---|
| CN | 203232191 U | 10/2013 |
| CN | 103728705 A | 4/2014 |
| CN | 103813069 A | 5/2014 |
| CN | 103842876 A | 6/2014 |
| CN | 105549173 A | 5/2016 |
| CN | 105717603 A | 6/2016 |
| EP | 2933670 A1 | 10/2015 |
| EP | 3410169 A1 | 12/2018 |
| JP | 2015018178 A | 1/2015 |
| JP | 5877206 B2 | 3/2016 |
| JP | 2016106239 A | 6/2016 |
| KR | 20120067104 A | 6/2012 |
| WO | 2016021865 A1 | 2/2016 |

OTHER PUBLICATIONS

Foreign Communication From A Counterpart Application, European Application No. 17889835.9, Extended European Search Report dated Dec. 4, 2019, 9 pages.

Machine Translation and Abstract of Chinese Publication No. CN102998764, Mar. 27, 2013, 8 pages.

Machine Translation and Abstract of Chinese Publication No. CN103246039, Aug. 14, 2013, 8 pages.

Machine Translation and Abstract of Chinese Publication No. CN103813069, May 21, 2014, 12 pages.

Machine Translation and Abstract of Chinese Publication No. CN203232191, Oct. 19, 2013, 8 pages.

Machine Translation and Abstract of Korean Publication No. KR20120067104, Jun. 25, 2012, 9 pages.

Foreign Communication From A Counterpart Application, Chinese Application No. 201780005261.4, Chinese Office Action dated Jul. 24, 2019, 10 pages.

Foreign Communication From A Counterpart Application, PCT Application No. PCT/CN2017/081820, English Translation of International Search Report dated Oct. 17, 2017, 2 pages.

Foreign Communication From A Counterpart Application, PCT Application No. PCT/CN2017/081820, English Translation of Written Opinion dated Oct. 17, 2017, 4 pages.

* cited by examiner

FIG. 6

LENS STRUCTURE, LENS STRUCTURE FABRICATION METHOD, AND CAMERA

CROSS-REFERENCE TO RELATED APPLICATIONS

This application is a U.S. National Stage of International Patent Application No. PCT/CN2017/081820 filed on Apr. 25, 2017, which claims priority to Chinese Patent Application No. 201710002830.1 filed on Jan. 3, 2017. Both of the aforementioned applications are hereby incorporated by reference in their entireties.

TECHNICAL FIELD

Embodiments of this application relate to the field of photographing technologies, and in particular, to a lens structure, a camera including the lens structure, and a lens structure fabrication method.

BACKGROUND

Currently, a lens structure of a conventional camera (for example, a micro camera) includes: a lens tube, a plurality of lenses inside the lens tube, and a spacer between neighboring lenses. Central optical axes of lenses are slightly different. In addition, in an assembly process, a size of an inner cavity of the lens tube and assembly precision further inflict an impact, so that optical axes of neighboring lenses are relatively greatly different. As a result, quality of the lens structure relatively greatly fluctuates, and a yield is relatively low.

SUMMARY

Embodiments of this application provide a lens structure, a camera including the lens structure, and a lens structure fabrication method.

A lens structure is provided. The lens structure includes: a lens tube; a first lens located on a first end-face of the lens tube; and at least one second lens located inside the lens tube, where the first lens includes a light converging region and an edge region located at an edge around the light converging region, and a light shielding structure covers the edge region of the first lens. Because the entire lens structure is most sensitive to an alignment degree of an optical axis position of the first lens in the lens structure, based on the lens structure provided in the embodiments of this application, the first lens is disposed on an outer side of the lens tube, to dynamically assemble the first lens and the at least one second lens. Therefore, a high-quality lens structure can be obtained, and a yield of the lens structure can be improved. In addition, the light shielding structure covering the edge of the first lens can prevent a light ray in an external environment from entering the lens tube through the edge region of the first lens. In an implementation, the first lens is fixedly bonded with the light shielding structure, and the first lens is fixedly bonded with the lens tube. Optionally, in a specific implementation, the first lens may be fixedly bonded with the light shielding structure by using a liquid adhesive or a double-sided adhesive, and the first lens is also fixedly bonded with the lens tube by using a liquid adhesive or a double-sided adhesive, to reduce fastening process difficulty while ensuing firmness between the first lens and the light shielding structure and firmness between the first lens and the lens tube.

In an implementation, the light shielding structure is a polyester film, and a projected area that is of the light shielding structure and that is in a plane parallel to the edge region of the first lens is greater than a projected area that is of the edge region of the first lens and that is in the plane parallel to the edge region of the first lens, to ensure that the light shielding structure can completely cover a surface of the edge region and a side wall of the first lens, and prevent a light ray in an external environment from entering the lens tube through the edge region and the side wall of the first lens.

In an implementation, the light shielding structure includes: a plastic component. The plastic component covers at least the edge region of the first lens, so that a depth of the first light transmission hole is not less than a thickness of the light converging region of the first lens, to protect the light converging region of the first lens, and reduce a probability of wearing the light converging region of the first lens. Based on this, the plastic component may completely cover the surface of the edge region of the first lens and the side wall of the first lens, or may cover only the surface of the edge region of the first lens. When the plastic component covers only the surface of the edge region of the first lens, the light shielding structure further includes: a light shielding component, where the light shielding component covers at least the side wall of the edge region.

A camera is provided. The camera includes: the lens structure according to any one of the foregoing implementations; a light sensing component located on a second end-face of the lens tube of the lens structure, where the second end-face is a face that is in the lens tube and that is opposite to the first end-face; and a circuit board, located on a side that is of the light sensing component and that is opposite to the lens structure, and electrically connected to the light sensing component.

A lens structure fabrication method includes: first providing a lens tube and a light shielding structure, where at least one second lens is disposed inside the lens tube, and the light shielding structure has a first light transmission hole; then fastening a first lens on a first surface of the light shielding structure to form a first assembly structure, where the first lens includes a light converging region and an edge region located at an edge around the light converging region, and the first light transmission hole exposes the light converging region; then placing the first assembly structure on a first end-face of the lens tube; adjusting the first assembly structure until a resolution of the lens structure is greater than a preset value; and finally fastening the lens tube and the first assembly structure to fabricate the lens structure.

Based on this, in an implementation, the fastening a first lens on a first surface of the light shielding structure to form a first assembly structure, where the first lens includes a light converging region and an edge region located at an edge around the light converging region, and the first light transmission hole exposes the light converging region includes: coating the first surface of the light shielding structure with a bonding adhesive, where the light shielding structure has the first light transmission hole, and the bonding adhesive includes a UV heat curing adhesive; placing the first lens on the first surface of the light shielding structure, where the first lens includes the light converging region and the edge region located at the edge around the light converging region, and the first light transmission hole exposes the light converging region; and illuminating a part that is of the bonding adhesive and that is located at the edge region by using UV light, to perform UV curing for the first time to fixedly connect the first lens and the light shielding structure.

In an implementation, the placing the first assembly structure on a first end-face of the lens tube includes: coating the first end-face of the lens tube with a bonding adhesive, where the bonding adhesive includes a UV heat curing adhesive; and on the first end-face, placing the first assembly structure on a side that is of the first lens and that faces the first end-face of the lens tube.

Specifically, in an implementation, the adjusting the first assembly structure until a resolution of the lens structure is greater than a preset value includes: fastening the light shielding structure by using a clamping apparatus, and adjusting a position of the first lens by moving the light shielding structure: detecting a resolution of the lens structure at each adjustment position; and when the resolution of the lens structure is greater than a preset value, skipping moving a position of the first assembly structure.

In an implementation, the fastening the lens tube and the first assembly structure includes: illuminating the bonding adhesive from the bottom of the lens tube by using UV light, to perform UV curing for the second time; and heating the whole formed by the lens tube and the first assembly structure, to perform thermal curing to fixedly connect the lens tube and the first assembly structure.

Based on the lens structure provided in the embodiments of this application, the first lens is disposed on an outer side of a housing of the lens tube. Therefore, an adjustment degree is relatively high, and convenience and flexibility are relatively desirable. In addition, in fabrication of the lens structure provided in the embodiments of this application, when the resolution of the lens structure is greater than the preset value, the position of the first lens is fastened, so that an optical axis of the first lens and an optical axis of the at least one second lens are aligned at a relatively high extent, thereby improving quality of the lens structure and a yield of the lens structure.

In addition, based on the lens structure provided in the embodiments of this application, the first lens and the at least one second lens are independently disposed. Therefore, the lens tube including the at least one second lens and a structure obtained after assembling the first lens and the lens tube can be separately tested, to distinguish whether a reason for a quality problem of the lens structure is an assembly problem of the at least one second lens or a position arrangement problem of the first lens.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

As described in the background, quality of a lens structure of a conventional camera relatively greatly fluctuates, and a yield is relatively low.

The inventors find through researches that a first lens that is inside a lens structure and that is close to a side of a light transmission hole of the lens structure is relatively near a focal point of the lens structure, and incident light first passes through the first lens when being incident on the lens structure. Therefore, the lens structure is most sensitive to an alignment degree of an optical axis position of the first lens in the lens structure. A high-quality lens structure can be obtained, and a yield of the lens structure can be improved by dynamically adjusting the optical axis position of the first lens.

However, in the lens structure of the conventional camera, each lens is located inside a lens tube, and a position of the first lens can be conveniently adjusted only by providing a groove on a side surface or a top surface of the lens tube. Then, the first lens is fastened after adjustment, and the provided groove is sealed. Therefore, an adjustment degree is relatively limited, and adjustment is relatively inconvenient and inflexible.

In addition, when the lens structure has a quality problem, it is difficult to distinguish whether a reason is a position adjustment problem of the first lens or an assembly problem of another lens.

Figure 1:
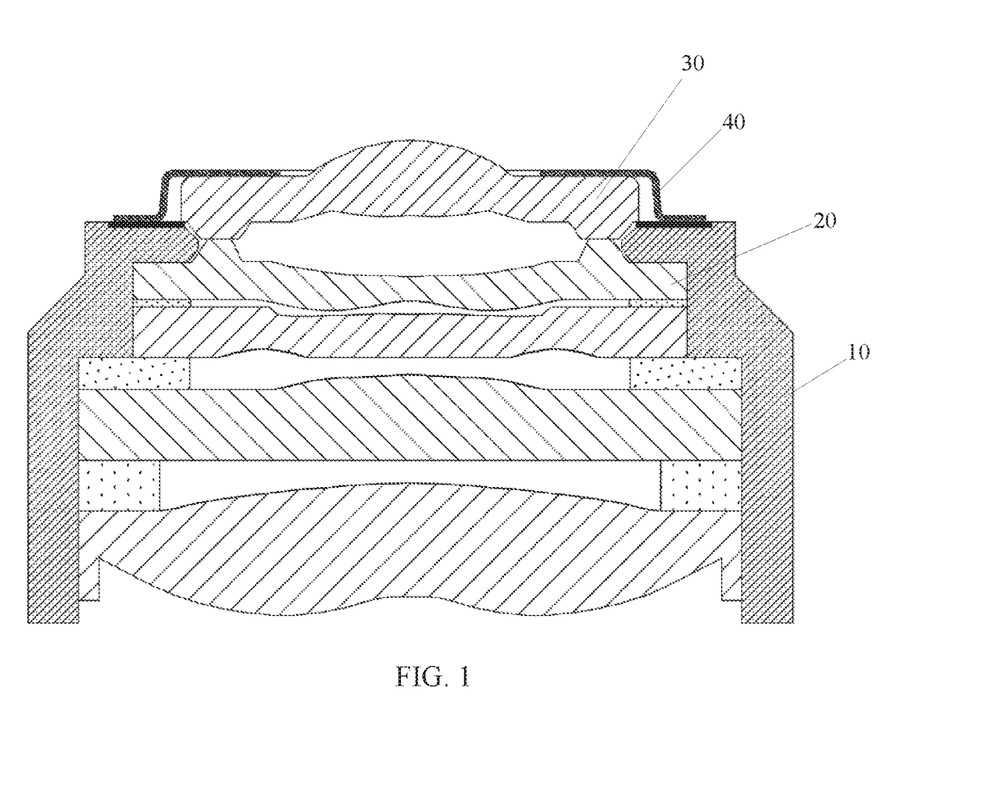
FIG. 1 is a schematic structural diagram of a part of a lens structure according to an embodiment of this application.

In view of this, an embodiment of this application provides a lens structure. As shown in FIG. 1, the lens structure includes: a lens tube 10; a first lens 30 located on a first end-face of the lens tube 10, where the first lens 30 includes a light converging region and an edge region located at an edge around the light converging region; a light shielding structure 40 covering the edge region of the first lens 30; and at least one second lens 20 located inside the lens tube 10.

It should be noted that in this embodiment of this application, the first end-face of the lens tube is a surface that is of the lens tube and that faces a side of a to-be-taken image when the lens structure is in a using state, that is, an outer surface that is of the lens tube and that faces a side of the first lens. It should be further noted that in this embodiment of this application, when the at least one second lens 20 includes a plurality of second lenses, the plurality of second lenses may be the same or different. This is not limited in this embodiment of this application, and specifically depends on a particular case.

Based on the foregoing embodiment, in an embodiment of this application, the first lens 30 is fixedly bonded with the light shielding structure 40, and the first lens 30 is fixedly bonded with the lens tube 10, so that the light shielding structure 40 is used to cover the edge region of the first lens 30, to prevent a light ray in an external environment from entering the lens tube 10 through the edge region of the first lens 30. However, this is not limited in this embodiment of this application, and specifically depends on a particular case.

Specifically, in an embodiment of this application, the first lens 30 is fixedly bonded with the light shielding structure 40 by using a liquid adhesive or a double-sided adhesive, and the first lens 30 is also fixedly bonded with the lens tube 10 by using a liquid adhesive or a double-sided adhesive. In the following, the first lens 30 is fixedly bonded with the light shielding structure 40 by using a UV heat curing adhesive, and the first lens 30 is also fixedly bonded with the lens tube 10 by using a UV heat curing adhesive, to describe the lens structure provided in this embodiment of this application. However, this is not limited in this embodiment of this application, and specifically depends on a particular case.

Based on any one of the foregoing embodiments, as shown in FIG. 1, the light shielding structure 40 is a polyester film. Optionally, a projected area that is of the light shielding structure 40 and that is in a plane parallel to the edge region of the first lens 30 is greater than a projected area that is of the edge region of the first lens 30 and that is in the plane parallel to the edge region of the first lens 30, so that the light shielding structure 40 completely covers the edge region of the first lens 30 and a side wall of the first lens 30, and a light ray in an external environment is prevented from entering the lens tube 10 through the edge region of the first lens 30 and the side wall of the first lens 30.

Figure 2:
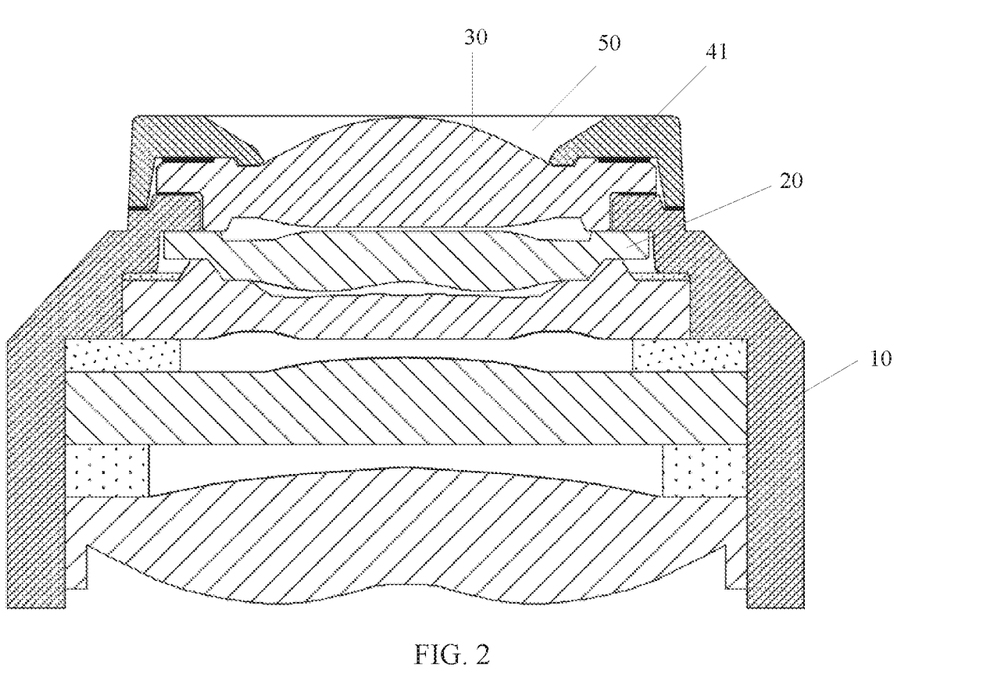
FIG. 2 is a schematic structural diagram of a part of a lens structure according to another embodiment of this application.

As shown in FIG. 2, in another embodiment of this application, the light shielding structure 40 includes: a plastic component 41. The plastic component 41 covers at least the edge region of the first lens 30, so that a depth of the first light transmission hole 50 is not less than a thickness of the light converging region of the first lens 30, to protect the light converging region of the first lens 30, and reduce a probability of wearing the light converging region of the first lens 30.

Optionally, the plastic component 41 is made of polycarbonate (Polycarbonate, PC for short), and the lens tube 10 is made of a material that is the same as that of the plastic component 41. However, this is not limited in this embodiment of this application, and specifically depends on a particular case.

In an embodiment of this application, as shown in FIG. 2, the plastic component 41 completely covers the edge region of the first lens 30 and the side wall of the first lens 30. Specifically, the plastic component 41 includes a horizontal part and a vertical part. The horizontal part completely covers a surface of the edge region of the first lens 30, and the vertical part blocks the side wall of the first lens 30. Optionally, in a direction perpendicular to the horizontal part, a height of the vertical part is greater than a thickness of the side wall of the first lens 30, to prevent a light ray in an external environment from being incident on the first lens 30 in a plane parallel to the horizontal part. It should be noted that in this embodiment of this application, the plastic component 41 may completely cover the surface of the edge region and the side wall of the first lens 30, and another additional structure does not need to be disposed, so that a structure is relatively simple.

Figure 3:
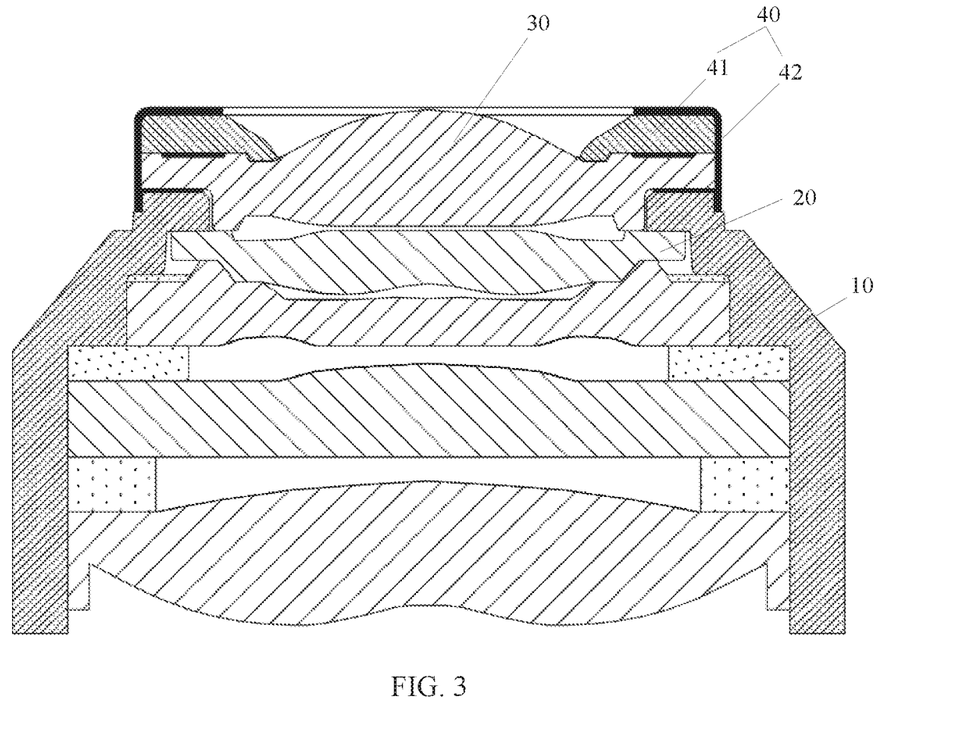
FIG. 3 is a schematic structural diagram of a part of a lens structure according to still another embodiment of this application.
Figure 4:
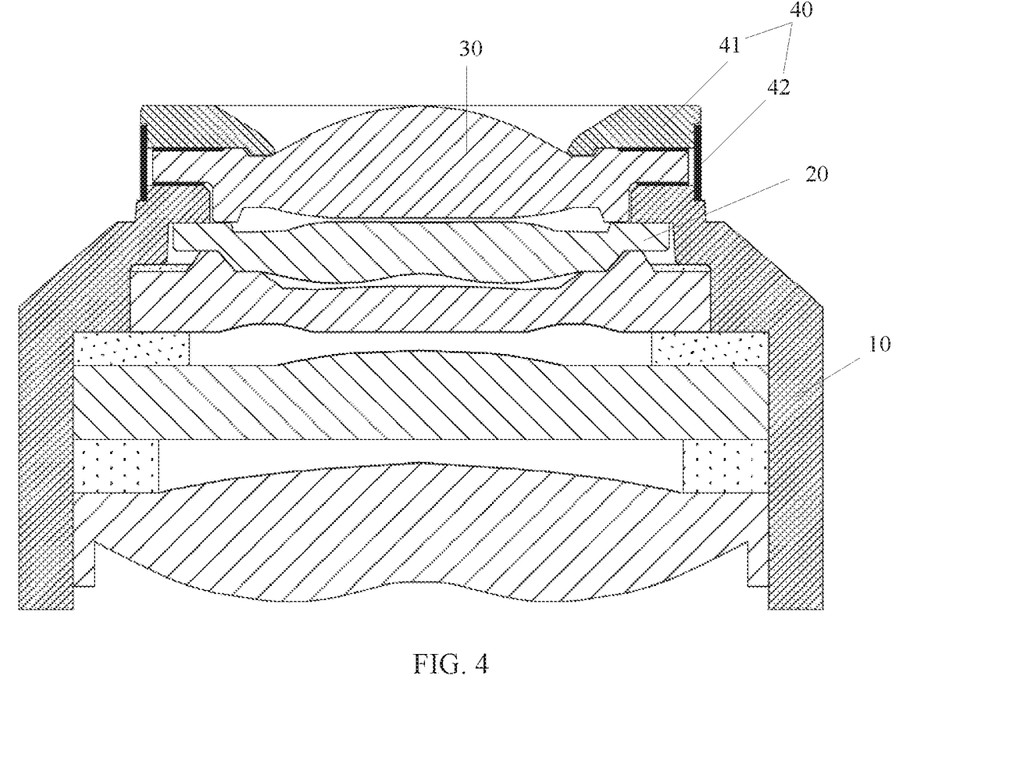
FIG. 4 is a schematic structural diagram of a part of a lens structure according to yet another embodiment of this application.

In another embodiment of this application, the plastic component 41 covers only the surface of the edge region of the first lens 30. In this embodiment of this application, as shown in FIG. 3 and FIG. 4, the light shielding structure 40 further includes a light shielding component 42. The light shielding component 42 covers at least the side wall of the edge region (that is, the side wall of the first lens 30), and is configured to shield light for the side wall of the first lens 30. Specifically, in an embodiment of this application, as shown in FIG. 3, the light shielding component 42 covers both side walls of the plastic component 41 and the first lens 30. In another embodiment of this application, as shown in FIG. 4, the light shielding component 42 covers only the side wall of the first lens 30. Optionally, the light shielding component 42 further extends along a thickness direction of the first lens 30 to cover a part of the side wall of the plastic component 41 and a part of a side wall of the lens tube 10. However, this is not limited in this embodiment of this application, and specifically depends on a particular case. It should be noted that in this embodiment of this application, the plastic component 41 and the light shielding component 42 combine to completely cover the surface of the edge region and the side wall of the first lens 30. This is not limited in this embodiment of this application, and specifically depends on a particular case.

It should be further noted that in any one of the foregoing embodiments, to further improve firmness among the light shielding structure 40, the first lens 30, and the lens tube 10, in an optional embodiment of this application, the light shielding structure 40 is also fixedly bonded with the lens tube 10.

Correspondingly, an embodiment of this application further provides a camera having the lens structure provided in any one of the foregoing embodiments. Specifically, the camera includes: the lens structure provided in any one of the foregoing embodiments; a light sensing component located on a second end-face of the lens tube of the lens structure, where the second end-face is a face that is in the lens tube and that is opposite to the first end-face; and a circuit board, located on a side that is of the light sensing component and that is opposite to the lens structure, and electrically connected to the light sensing component. The circuit board may be a PCB circuit board, and this is not limited in this embodiment of this application.

During specific working, the lens tube structure is configured to collect light rays. The light sensing component is configured to: sense the light rays collected by the lens tube structure, convert the light rays to electrical signals, then convert the electrical signals to digital signals, and transmit the digital signals to the circuit board. The circuit board outputs the digital signals to the terminal. An image processing component of the terminal processes the digital signals to form an image.

As can be known from above, in the lens structure and the camera including the lens structure provided in the embodiments of this application, the first lens 30 is disposed outside the lens tube 10. Therefore, an adjustment degree is relatively high, and convenience and flexibility are relatively desirable. In addition, in the lens structure and the camera including the lens structure provided in the embodiments of this application, the first lens 30 and the lens tube 10 including the at least one second lens 20 are independently disposed. Therefore, the lens tube 10 including the at least one second lens 20 and a structure obtained after assembling the first lens 30 and the lens tube 10 can be separately tested, to distinguish whether a reason for a quality problem of the lens structure is an assembly problem of the at least one second lens 20 or a position arrangement problem of the first lens 30.

Figure 5:
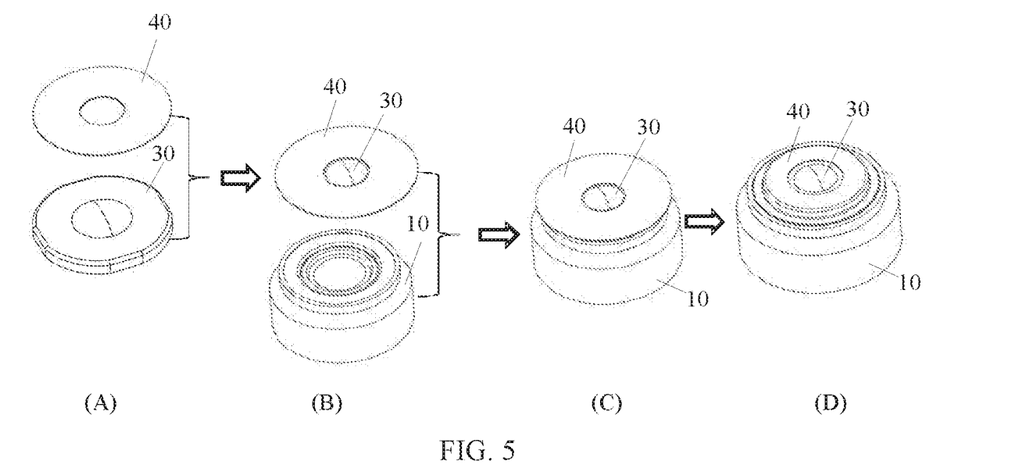
FIG. 5 is a flowchart of a lens structure fabrication method according to an embodiment of this application.

Correspondingly, an embodiment of this application further provides a lens structure fabrication method. As shown in FIG. 1 and FIG. 5, the method includes:

providing a lens tube 10, where at least one second lens is disposed inside the lens tube 10 (not shown in the figure);

providing a light shielding structure 40, where the light shielding structure 40 has a first light transmission hole, as shown in FIG. 5 (A);

fastening a first lens 30 on a first surface of the light shielding structure 40 to form a first assembly structure, where the first lens 30 includes a light converging region and an edge region located at an edge around the light converging region, and the first light transmission hole exposes the light converging region;

placing the first assembly structure on a first end-face of the lens tube 10, as shown in FIG. 5 (B);

adjusting the first assembly structure until a resolution of the lens structure is greater than a preset value; and fastening the lens tube 10 and the first assembly structure, as shown in FIG. 5 (C) and FIG. 5 (D).

Specifically, based on the foregoing embodiment, in an embodiment of this application, the providing a lens tube 10, where at least one second lens is disposed inside the lens tube 10 includes:

providing a lens tube 10, where at least one second lens is disposed inside the lens tube 10; detecting a resolution of the lens tube 10 to determine an alignment degree of the at least one second lens in the lens tube 10; and when the resolution of the lens tube 10 satisfies a preset requirement, marking the lens tube 10 as a lens tube satisfying an assembly requirement, to be subsequently assembled with the first assembly structure.

An example in which the light shielding structure 40 is a polyester film is used below to describe the lens structure fabrication method provided in this embodiment of this application.

Based on any one of the foregoing embodiments, in an embodiment of this application, the fastening a first lens 30 on a first surface of the light shielding structure 40 to form a first assembly structure, where the first lens 30 includes a light converging region and an edge region located at an edge around the light converging region, and the first light transmission hole exposes the light converging region includes:

coating the first surface of the light shielding structure 40 with a bonding adhesive, where the light shielding structure 40 has the first light transmission hole, and the bonding adhesive includes a UV heat curing adhesive;

placing the first lens 30 on the first surface of the light shielding structure 40, where the first lens 30 includes the light converging region and the edge region located at the edge around the light converging region, and the first light transmission hole exposes the light converging region; and illuminating a part that is of the bonding adhesive and that is located at the edge region by using UV light, to perform UV curing for the first time to fixedly connect the first lens 30 and the light shielding structure 40.

It should be noted that when the light shielding structure 40 is a polyester film, a projected area that is of the light shielding structure 40 and that is in a plane parallel to the edge region of the first lens 30 is greater than a projected area that is of the edge region of the first lens 30 and that is in the plane parallel to the edge region of the first lens 30. Therefore, to facilitate subsequent fixed bonding between the light shielding structure 40 and the lens tube 10, a part that is of the bonding adhesive and that is located at the edge region is illuminated by using UV light, to perform UV curing for the first time. When the first lens 30 is fixedly connected to the light shielding structure 40, optionally, the method further includes: shielding a non-overlapped region of the polyester film and the first lens 30 by using an auxiliary light shielding structure, to maintain bonding performance of the non-overlapped region of the polyester film and the first lens 30.

Figure 6:
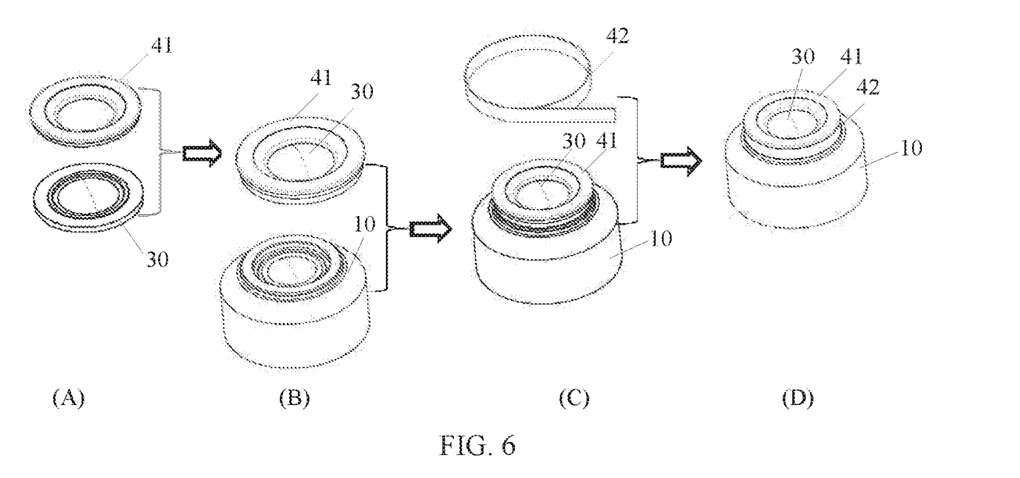
FIG. 6 is a flowchart of a lens structure fabrication method according to another embodiment of this application.

It should be further noted that in another embodiment of this application, when the light shielding structure 40 includes a plastic component 41 and a light shielding component 42, as shown in FIG. 4 and FIG. 6, the fastening a first lens 30 on a first surface of the light shielding structure 40 to form a first assembly structure, where the first lens 30 includes a light converging region and an edge region located at an edge around the light converging region, and the first light transmission hole exposes the light converging region includes:

coating a first surface of the plastic component 41 with a bonding adhesive, where the plastic component has a first light transmission hole, and the bonding adhesive includes a UV heat curing adhesive, as shown in FIG. 6 (A) and FIG. 6 (B); placing the first lens 30 on the first surface of the plastic component, where the first lens 30 includes the light converging region and the edge region located at the edge around the light converging region, and the first light transmission hole exposes the light converging region; and illuminating a part that is of the bonding adhesive and that is located at the edge region by using UV light, to perform UV curing for the first time to fixedly connect the first lens 30 and the plastic component.

After the first lens 30 is fixedly connected to the plastic component, still as shown in FIG. 6 (B), the first assembly structure is disposed on the first end-face of the lens tube 10. The first assembly structure is adjusted until the resolution of the lens structure is greater than the preset value. The lens tube 10 and the first assembly structure are fastened, as shown in FIG. 6 (C). After the first assembly structure is fixedly connected to the lens tube 10, as shown in FIG. 6 (D), the light shielding component 42 is fastened, where the light shielding component 42 covers at least the side wall of the edge region.

Based on any one of the foregoing embodiments, in an embodiment of this application, the placing the first assembly structure on a first end-face of the lens tube 10 includes:

coating the first end-face of the lens tube 10 with a bonding adhesive, where the bonding adhesive includes a UV heat curing adhesive; and placing the first assembly structure on a side on which the first lens 30 faces the first end-face of the lens tube 10 on the first end-face. It should be noted that in this embodiment of this application, after the first assembly structure is disposed, the first assembly structure is not fastened, and instead, an activity region of the first assembly structure is determined, so that the first assembly structure is conveniently adjusted within the activity region, and the resolution of the lens structure is greater than the preset value.

It should be noted that requirements of the resolution of the lens structure are different because of different application requirements. Therefore, a specific value of the preset value is not limited in this embodiment of this application, and specifically depends on a particular case.

Based on any one of the foregoing embodiments, in an embodiment of this application, the adjusting the first assembly structure until a resolution of the lens structure is greater than a preset value includes:

fastening the light shielding structure 40 by using a clamping apparatus, and adjusting a position of the first lens 30 by moving the light shielding structure 40;

detecting a resolution of the lens structure at each adjustment position; and when the resolution of the lens structure is greater than a preset value, skipping moving a position of the first assembly structure.

Optionally, the clamping apparatus includes a suction nozzle and/or an adjustment machine using a dynamic adjustment technology. However, this is not limited in this embodiment of this application, and specifically depends on a particular case.

Specifically, in an embodiment of this application, the adjusting the first assembly structure until a resolution of the lens structure is greater than a preset value includes:

disposing a light sensing component on a side that is of the lens tube 10 and that is opposite to the first end-face; fastening the light shielding structure 40 by using the clamping apparatus, and adjusting a position of the first lens 30 by moving the light shielding structure 40, so that optical axes of the first lens 30 and the at least one second lens 20 are aligned; collecting an image at each adjustment position by using the lens structure formed by the lens tube 10 and the first assembly structure; analyzing a definition resolution of the collected image to determine the resolution of the lens structure; when the resolution of the lens structure is not greater than the preset value, adjusting the position of the first assembly structure; repeating the foregoing image collection and analysis process until the resolution of the lens structure is greater than the preset value; and fastening a current position of the lens structure.

It should be noted that based on the foregoing embodiments, in an embodiment of this application, after the current position of the lens structure is fastened, the method further includes: applying pressure and leveling around the light shielding structure 40, so that air-tightness of the light shielding structure 40, the first lens 30, and the lens tube 10 is facilitated, and a light shielding effect is improved while an ideal shape is obtained.

Based on any one of the foregoing embodiments, in an embodiment of this application, the fastening the lens tube 10 and the first assembly structure includes:

illuminating the bonding adhesive from the bottom of the lens tube 10 by using UV light, to perform UV curing for the second time; and heating the whole formed by the lens tube 10 and the first assembly structure, to perform thermal curing to fixedly connect the lens tube 10 and the first assembly structure.

As can be known from the foregoing analysis, the entire lens structure is most sensitive to an alignment degree of an optical axis position of the first lens in the lens structure. In the lens structure and the lens structure fabrication method provided in the embodiments of this application, the first lens 30 is disposed on an outer side of a housing of the lens tube. Therefore, an adjustment degree is relatively high, and convenience and flexibility are relatively desirable. In addition, in the lens structure and the lens structure fabrication method provided in the embodiments of this application, when the resolution of the lens structure is greater than the preset value, the position of the first lens 30 is fastened, so that an optical axis of the first lens 30 and an optical axis of the at least one second lens 20 are aligned at a relatively high extent, thereby improving quality of the lens structure.

In addition, in the lens structure and the lens structure fabrication method provided in the embodiments of this application, the first lens 30 and the at least one second lens 20 are independently disposed. Therefore, the lens tube including the at least one second lens 20 and a structure obtained after assembling the first lens 30 and the lens tube can be separately tested, to distinguish whether a reason for a quality problem of the lens structure is an assembly problem of the at least one second lens 20 or a position arrangement problem of the first lens 30.

The embodiments in the specification are all described in a progressive manner. For same or similar parts in the embodiments, refer to these embodiments, and each embodiment focuses on a difference from other embodiments. The apparatus disclosed in the embodiments is described relatively simply because it corresponds to the method disclosed in the embodiments, and for portions related to those of the method, refer to the description of the method.

The embodiments disclosed above are described to enable a person skilled in the art to implement or use this application. Various modifications made to the embodiments are obvious to a person skilled in the art, and the general principles defined herein may also be implemented in other embodiments without departing from the spirit or scope of this application. Therefore, this application is not limited to these embodiments described herein, but shall be construed in the widest scope consistent with the principles and novel features disclosed herein.

What is claimed is:

1. A lens structure, comprising:
   a lens tube;
   a first lens located at a first end-face of the lens tube and comprising a side wall located outside of the lens tube, wherein the first lens comprises a light converging region and an edge region located around an edge of the light converging region;
   a light shielding structure covering the edge region of the first lens; and
   at least one second lens located inside the lens tube.

2. The lens structure of claim 1, wherein the first lens is fixedly bonded to the light shielding structure, and wherein the first lens is fixedly bonded to the lens tube.

3. The lens structure of claim 2, wherein the first lens is fixedly bonded to the light shielding structure using a liquid adhesive or a double-sided adhesive.

4. The lens structure of claim 1, wherein the light shielding structure is a polyester film, and wherein a projected area of the light shielding structure in a plane parallel to the edge region of the first lens is greater than a projected area of the edge region of the first lens in the plane parallel to the edge region of the first lens.

5. The lens structure of claim 1, wherein the light shielding structure comprises a plastic component.

6. The lens structure of claim 5, wherein the plastic component completely covers a surface of the edge region of the first lens and the side wall.

7. The lens structure of claim 5, wherein the plastic component covers only a surface of the edge region of the first lens, and wherein the light shielding structure further comprises a light shielding component that covers the side wall.

8. A camera, comprising:
   a lens structure, comprising:
     a lens tube;
     a first lens located at a first end-face of the lens tube and comprising a side wall located outside of the lens tube, wherein the first lens comprises a light converging region and an edge region located around an edge of the light converging region;
     a light shielding structure covering the edge region of the first lens; and
     at least one second lens located inside of the lens tube;
   a light sensing component located on a second end-face of the lens tube of the lens structure, wherein the second end-face is a face that is in the lens tube and that is opposite to the first end-face; and a circuit board located on a side of the light sensing component that is opposite to the lens structure, wherein the circuit board is electrically connected to the light sensing component.

9. A lens structure fabrication method, comprising:

providing a lens tube, wherein at least one second lens is disposed inside of the lens tube;

providing a light shielding structure comprising a first light transmission hole;

fastening a first lens on a first surface of the light shielding structure to form a first assembly structure, wherein the first lens comprises a light converging region and an edge region located around an edge of the light converging region, and wherein the first light transmission hole exposes the light converging region;

placing the first assembly structure at a first end-face of the lens tube;

adjusting the first assembly structure until a resolution of the lens structure is greater than a preset value; and fastening the lens tube and the first assembly structure.

10. The lens structure fabrication method of claim 9, wherein the fastening the first lens on the first surface of the light shielding structure to form the first assembly structure comprises:

coating the first surface of the light shielding structure with a bonding adhesive, wherein the light shielding structure has the first light transmission hole, wherein the bonding adhesive comprises an ultra violet (UV) heat curing adhesive, and wherein the first light transmission hole exposes the light converging region;

placing the first lens on the first surface of the light shielding structure, and illuminating a part of the bonding adhesive that is located at the edge region using UV light to perform first UV curing to fixedly connect the first lens and the light shielding structure.

11. The lens structure fabrication method of claim 9, wherein the placing the first assembly structure on the first end-face of the lens tube comprises:

coating the first end-face of the lens tube with a bonding adhesive that comprises an ultra violet (UV) heat curing adhesive; and on the first end-face, placing the first assembly structure on a side of the first lens that faces the first end-face of the lens tube.

12. The lens structure fabrication method according to claim 11, wherein the adjusting the first assembly structure until the resolution of the lens structure is greater than the preset value comprises:

fastening the light shielding structure using a clamping apparatus;

adjusting a position of the first lens by moving the light shielding structure;

detecting the resolution of the lens structure at each adjustment position; and when the resolution of the lens structure is greater than the preset value, skipping moving a position of the first assembly structure.

13. The lens structure fabrication method of claim 10, wherein the fastening the lens tube and the first assembly structure comprises:

illuminating the bonding adhesive from a bottom of the lens tube using UV light to perform UV curing for the second time; and heating a hole formed by the lens tube and the first assembly structure to perform thermal curing to fixedly connect the lens tube and the first assembly structure.

14. The camera of claim 8, wherein the first lens is fixedly bonded to the light shielding structure using a liquid adhesive.

15. The camera of claim 8, wherein the first lens is fixedly bonded to the light shielding structure using a double-sided adhesive.

16. The camera of claim 8, wherein the light shielding structure is a polyester film, and wherein a projected area of the light shielding structure in a plane parallel to the edge region of the first lens is greater than a projected area of the edge region of the first lens in the plane parallel to the edge region of the first lens.

17. The camera of claim 8, wherein the light shielding structure comprises a plastic component.

18. The camera of claim 17, wherein the plastic component completely covers a surface of the edge region of the first lens and a side wall of the first lens.

19. The camera of claim 8, wherein the at least one second lens comprises multiple lenses, and wherein each of the multiple lenses is different than each other of the multiple lenses.

20. The camera of claim 19, wherein a first of the multiple lenses is located between a second of the multiple lenses and the first lens.

* * * * *

UNITED STATES PATENT AND TRADEMARK OFFICE
CERTIFICATE OF CORRECTION

| | |
|---|---|
| PATENT NO. | : 11,249,276 B2 |
| APPLICATION NO. | : 16/475488 |
| DATED | : February 15, 2022 |
| INVENTOR(S) | : Jianwen Wang, Hsienchang Hou and Hung-Yuan Jau |

It is certified that error appears in the above-identified patent and that said Letters Patent is hereby corrected as shown below:

On the Title Page

Item (57) Abstract, Line 1: "lens tube; a first" should read "lens tube and a first"

Item (57) Abstract, Line 2: "tube, where the first" should read "tube. The first"

Item (57) Abstract, Line 4: "region; a light shielding" should read "region. The lens structure further includes a light shielding"

Item (57) Abstract, Line 5: "first lens; and at" should read "first lens, and at"

Item (57) Abstract, Lines 6-7: "lens tube. Based on the lens structure, the first lens" should read "lens tube. The first lens"

Item (57) Abstract, Lines 8-10: "lens tube. Therefore, an adjustment degree is relatively high, and convenience and flexibility are relatively desirable. In addition, an optical" should read "lens tube. An optical"

Item (57) Abstract, Lines 12-13: "high extent, thereby improving quality of the lens structure and a yield of the lens structure." should read "high extent."

Signed and Sealed this
Third Day of May, 2022

Katherine Kelly Vidal
*Director of the United States Patent and Trademark Office*